(12) United States Patent
Cohen et al.

(10) Patent No.: US 6,873,329 B2
(45) Date of Patent: Mar. 29, 2005

(54) SYSTEM AND METHOD FOR CACHING AND RENDERING IMAGES

(75) Inventors: Andrew Cohen, Steamboat, CO (US); Scott Crouch, Steamboat, CO (US)

(73) Assignee: Spatial Data Technologies, Inc., Fort Collins, CO (US)

( * ) Notice: Subject to any disclaimer, the term of this patent is extended or adjusted under 35 U.S.C. 154(b) by 43 days.

(21) Appl. No.: 10/614,946

(22) Filed: Jul. 3, 2003

(65) Prior Publication Data

US 2004/0135784 A1 Jul. 15, 2004

Related U.S. Application Data (60) Provisional application No. 60/394,412, filed on Jul. 5, 2002.

(51) Int. Cl.[7] ............................. G06F 15/00; G06T 1/00
(52) U.S. Cl. ....................................... 345/501; 345/639
(58) Field of Search ................................. 345/501, 530, 345/639, 640, 418, 427, 557, 531

(56) References Cited

U.S. PATENT DOCUMENTS

| | | | |
|---|---|---|---|
| 4,876,651 A | 10/1989 | Dawson et al. | |
| RE36,145 E | 3/1999 | DeAguiar et al. | |
| 5,902,347 A | 5/1999 | Backman et al. | |
| 6,192,393 B1 | 2/2001 | Tarintino et al. | |
| 6,356,283 B1 | 3/2002 | Guedalia | |
| 6,424,345 B1 * | 7/2002 | Smith et al. | 345/423 |
| 6,657,635 B1 * | 12/2003 | Hutchins et al. | 345/543 |
| 2001/0032221 A1 | 10/2001 | Anwar | |
| 2002/0091738 A1 | 7/2002 | Rohrabaugh et al. | |
| 2002/0121209 A1 * | 9/2002 | Danilo et al. | 101/485 |

* cited by examiner

*Primary Examiner*—Kee M. Tung
(74) *Attorney, Agent, or Firm*—Cochran Freund & Young LLC (57) ABSTRACT

A system and method for caching and rendering an image database enables predictive loading of unrequested portions of the image. A raw image is preprocessed and subdivided into tiles. As a portion of a raw image is displayed on a screen and the user zooms and pans the image, a predicting algorithm determines which additional tiles should be loaded into cache so that the user suffers no lag time as additional tiles not in cache are loaded. The present system and method is adaptable to both raster and vector images.

21 Claims, 6 Drawing Sheets

SYSTEM AND METHOD FOR CACHING AND RENDERING IMAGES

CROSS REFERENCE TO RELATED APPLICATIONS

This application claims priority to and benefit of U.S. Provisional Patent Application No. 60/394,412 entitled "System and Method for Caching and Rendering Images" filed Jul. 5, 2002 by Andrew Cohen and Scott Crouch, the entire contents of which are hereby specifically incorporated by reference for all it discloses and teaches.

BACKGROUND OF THE INVENTION a. Field of the Invention

The present invention pertains generally to rendering digital images and specifically to high speed rendering vector and raster images using caching.

b. Description of the Background

Maps and other large graphical databases are difficult to display and manipulate on smaller computing devices. For example, hand held computers have small displays but also slow central processing units and limited memory. For these devices to be useful to display and manipulate image databases, the speed and memory limitations must be overcome. Other computing devices have similar memory and computational power limitations and can also benefit from enhanced performance.

Map data comes in two general forms: raster and vector data. Raster data may be bitmap images, such as aerial photographs and topological maps. Some map data may be in the form of vector data. For example, political boundaries or the routes of the interstate highway system may be in vector form. The generation of images may comprise both raster and vector data.

Databases that contain large images are often terabytes in size whereas the computing devices, such as hand held computers, may have only megabytes of storage space. Only a small portion of the database may be stored locally and used at any one time. In many cases, when a user pans or zooms the image, they may have to wait for a new portion of the database to be loaded and displayed on the screen. Sometimes, the 'lag time' for the new information to load is noticeable and frustrating for the user.

It would therefore be advantageous to provide a system and method for caching and rendering image databases that is fast and uses memory efficiently. It would further be advantageous if the system and method used the displaying computer's computational power efficiently.

SUMMARY OF THE INVENTION

The present invention overcomes the disadvantages and limitations of the prior art by providing a system and method of preprocessing a raw image, then displaying the image using a caching system wherein the caching system predicts and loads tiles of the preprocessed raw image that may be useful to the user. The system may be adapted to both raster and vector data.

The present invention may therefore comprise a method of caching and rendering an image comprising: providing a raw image to render; preprocessing the raw image to produce a plurality of tiles; determining a starting view, the starting view being a portion of the raw image and comprising a first set of tiles; loading the first set of the tiles into memory; displaying the starting view using the first set of tiles; providing a weighting algorithm that determines a weight for tiles; applying the weight to each of the tiles based on the weighting algorithm; providing a first analysis algorithm capable of analyzing the weight of each of the tiles to identify tiles that are not in the memory; identifying at least one tile that is not in the memory using the analysis algorithm; and loading the at least one tile into the memory.

The present invention may further comprise a method of caching and rendering a raw image comprising: receiving a raw image to render, the raw image comprising a plurality of vectors; determining a starting view to display, the starting view being a portion of the raw image; determining a cache space that is a superset of the starting view; determining a first set of intersecting vectors that intersect the cache space; trimming at least one of the vectors in the first set of vectors to approximately the limits of the cache space; storing the intersecting vectors in a cache; rendering the starting view by displaying the first set of intersecting vectors from the cache; receiving a first command from a user to change the view to a second view; determining if the second view is completely within the cache space; if at least a portion of the second view is within the cache space, rendering the second view using at least a portion of the intersecting vectors stored in the cache; and if at least a portion of the second view is outside of the cache space, determining additional intersecting vectors that intersect the second view and rendering the second view using at least a portion of the additional intersecting vectors.

The present invention may further comprise a system for caching and rendering an image comprising: a first computer system adapted to preprocess the image to produce a plurality of tiles; a second computer system adapted to determine a starting view, the starting view being a portion of the raw image and comprising a first set of tiles, load the first set of the tiles into memory, display the starting view using the first set of tiles, apply a weight to each of the tiles based on a weighting algorithm, identify at least one tile that is not in the memory using an analysis algorithm, and load the at least one tile into the memory.

The present invention may further comprise a system for caching and rendering a raw image comprising: a first computer program adapted to receive a raw image to render, the raw image comprising a plurality of vectors, determine a starting view to display, the starting view being a portion of the raw image, determine a cache space that is a superset of the starting view, determine a first set of intersecting vectors that intersect the cache space, trim at least one of the vectors in the first set of vectors to approximately the limits of the cache space, and store the intersecting vectors in a cache; a second computer program adapted to render the starting view by displaying the first set of intersecting vectors from the cache, receive a first command from a user to change the view to a second view, determine if the second view is completely within the cache space, if at least a portion of the second view is within the cache space, render the second view using at least a portion of the intersecting vectors stored in the cache, and if at least a portion of the second view is outside of the cache space, determine additional intersecting vectors that intersect the second view and rendering the second view using at least a portion of the additional intersecting vectors; a first computer adapted to execute the first computer program; and a second computer adapted to execute the second computer program.

The advantages of the present invention are that potentially useful portions of an image are identified, cached, and ready to be displayed for a user. The determination of which sections of a large image database to cache is based on rules and algorithms that may be adapted to particular applications. Both raster and vector image databases may be used with the present invention. Using the present invention, the speed of the display is not affected by the amount of data to be displayed.

DETAILED DESCRIPTION OF THE INVENTION

Figure 1:
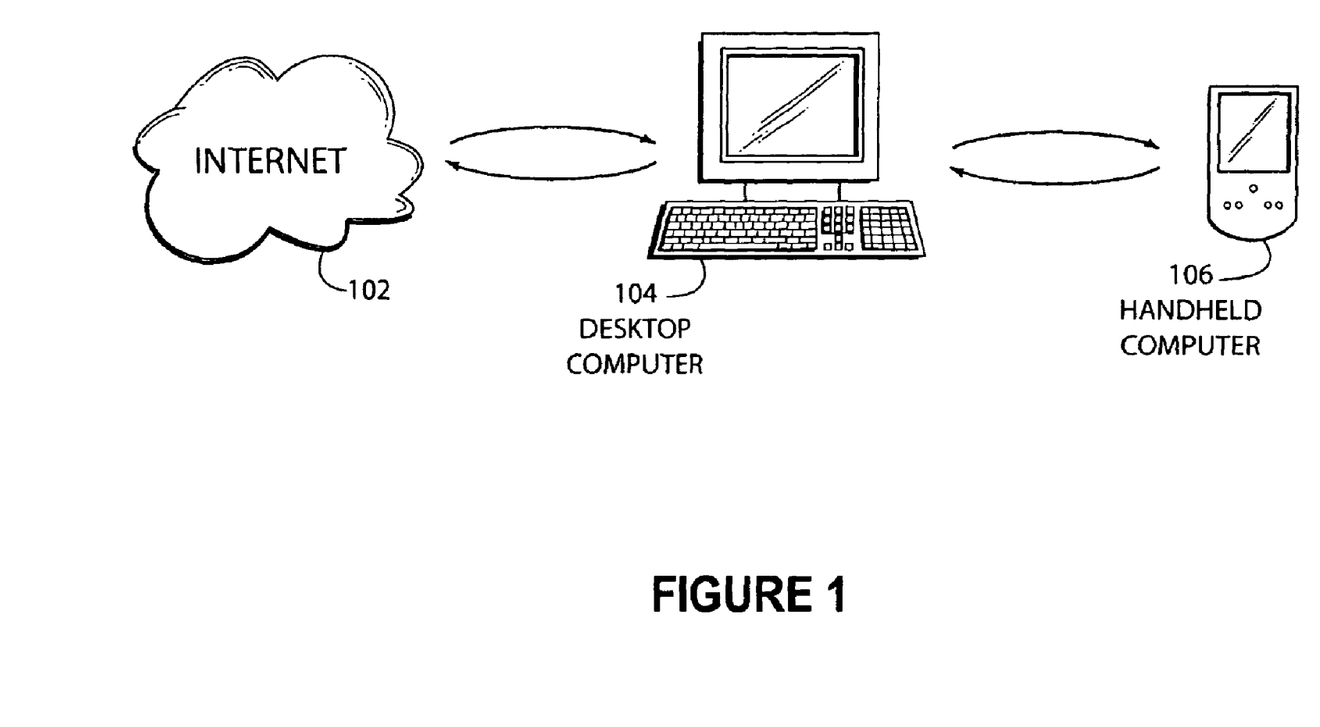
FIG. 1 is an illustration of the connection of the Internet with a desktop computer and a hand held computer.

FIG. 1 illustrates the connection of the Internet 102 with a desktop computer 104 and a hand held computer 106. In one embodiment of the present invention, the desktop computer 104 may receive an image from the Internet 102, preprocess the image, and transfer the image to the hand held computer 106.

The present invention allows large, complex images, such as maps, to be preprocessed and then displayed. The display device may have a slow processor and limited memory that makes displaying and panning and zooming of large databases almost impossible. The present invention allows for the efficient use of memory and relatively slow processing speed on smaller devices to make the image viewing experience of a user similar to a high speed device.

The present invention is directed at the display of large images on computing devices. For example, a map image from a server on the internet 102 may be prepared by a desktop computer 104 and transferred to the hand held computer 106. The hand held computer 106 may be detached from the desktop computer 104 and used in the field as a portable device.

In another embodiment of the present invention, a web server may contain a database of images. The web server may preprocess an image and prepare it to be displayed on a desktop computer using the present invention. In other embodiments, images may be displayed on global positioning system receivers, cellular phones, automotive computers, wireless devices, or the like.

In further embodiments of the present invention, a computer aided design system may display a portion of a mechanical design or a game system may display images associated with a game.

Figure 2:
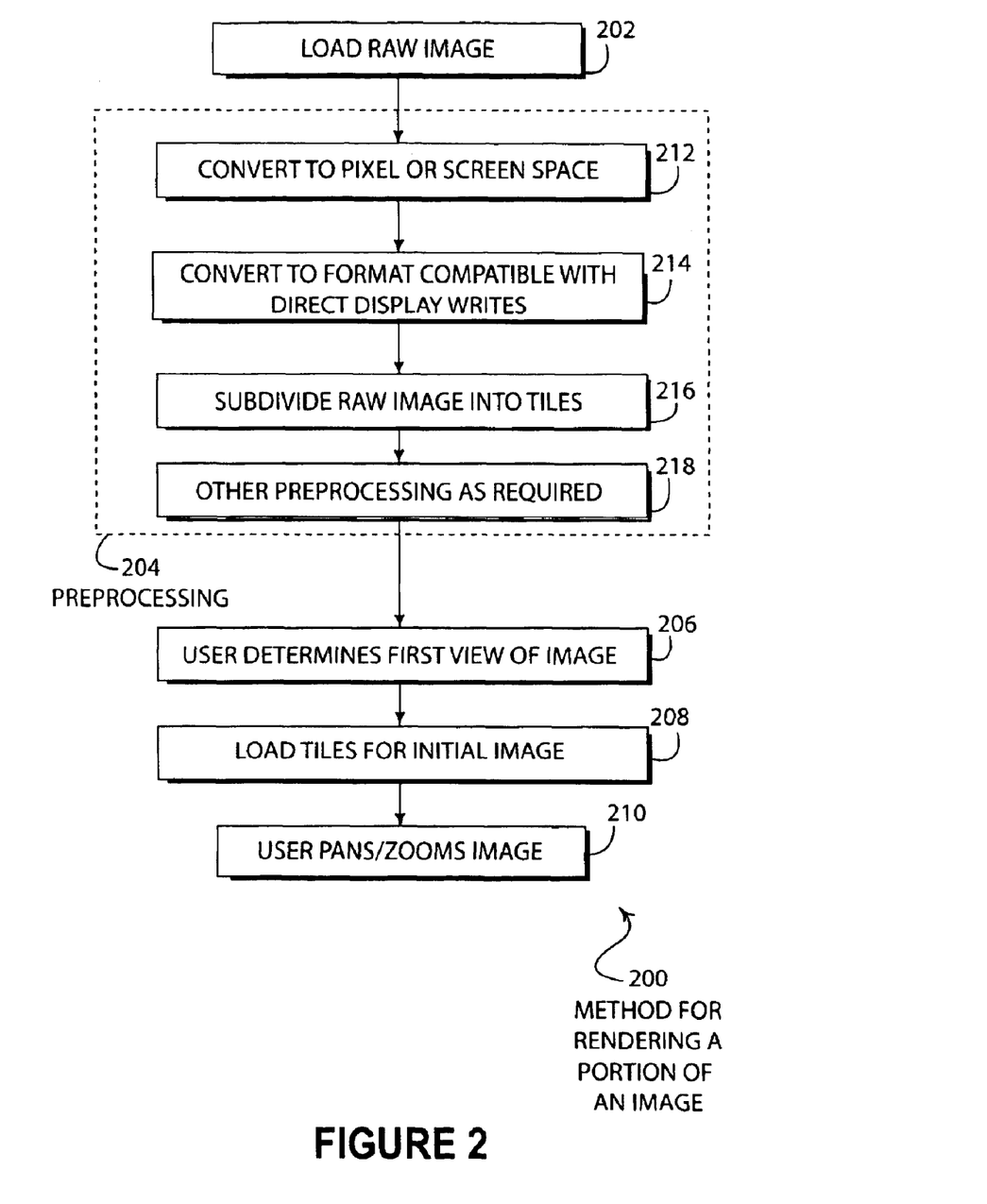
FIG. 2 is an illustration of a workflow diagram of an embodiment of the present invention of a method of rendering a portion of an image.

FIG. 2 illustrates a workflow diagram of an embodiment of the present invention of a method 200 of rendering a portion of an image. The raw image is loaded 202, preprocessed 204, an origin or first view is chosen 206, tiles for the first image is loaded 208, and the user may zoom or pan the image 210.

The preprocessing 204 may comprise converting the image to pixel or screen space 212, converting the image to a format compatible with writing directly to the display 214, optionally subdividing the raw image into tiles 216, and other preprocessing 218.

The raw image may come from virtually any source and contain any type of data. Map images, CAD data, or other graphical image may be used. The image may contain either or both raster or vector data.

The preprocessing 204 may or may not be performed on the same computing device that performs the pan and zoom 210. In some embodiments, the preprocessing 204 may be done at the time a user requests an image. Such a system may have a lag time wherein several functions are necessary to prepare an image to be displayed. In other embodiments, images may undergo the preprocessing 204 and be stored in a database prior to the user's request for the image.

The preprocessing routine 204 prepares an image for display on a device. For the example of a hand held computer, a map image may be converted from map coordinates to pixel or screen space 212. The step 212 may involve converting an image from elliptical geophysical coordinates to the rectangular coordinates of a display.

The image may be converted to a format compatible with writing directly to the display 214. For example, if the image contained 256 colors and the display was capable of displaying 16 colors optimally, the color of the image may be converted. To optimize the speed of the image panning and zooming, it may be desirable to write the image directly to the display hardware and bypass any software processing that a computer operating system may perform. Such techniques are common for graphics intensive applications.

Subdivision of the raw image into tiles 216 may optionally be performed at this time. In order to handle the large image, it is subdivided into tiles. If the initial size of the first view is known, the image may be subdivided during the preprocessing step 204. In other cases where the size of the initial view or subsequent views are not known, the subdivision of the image into tiles may be performed after the first view is determined.

The user may determine the first view of the image 206 through many mechanisms. For example, the origin of an image may be selected through a software application such as a website that is offering directions to a particular destination. In other cases, the user may choose a portion of a larger image to view by indicating the initial view from a scaled down view of the full image. The first view of the image 206 may include the origin or center and the scale or extents of the view. In some cases, the user may select two corners of the view.

The tiles are loaded 208 to display the first view of the image. The tiles may be sections of the image that, when butted up against each other, appear to be seamlessly continuous. The tile size may vary for different applications and different processing capabilities of the display device.

The user may zoom or pan the image 210 to change views during the course of using the image data. In some cases, the user may manually select the portions of the image to be displayed. In other cases, the device may change views under software control.

Figure 3:
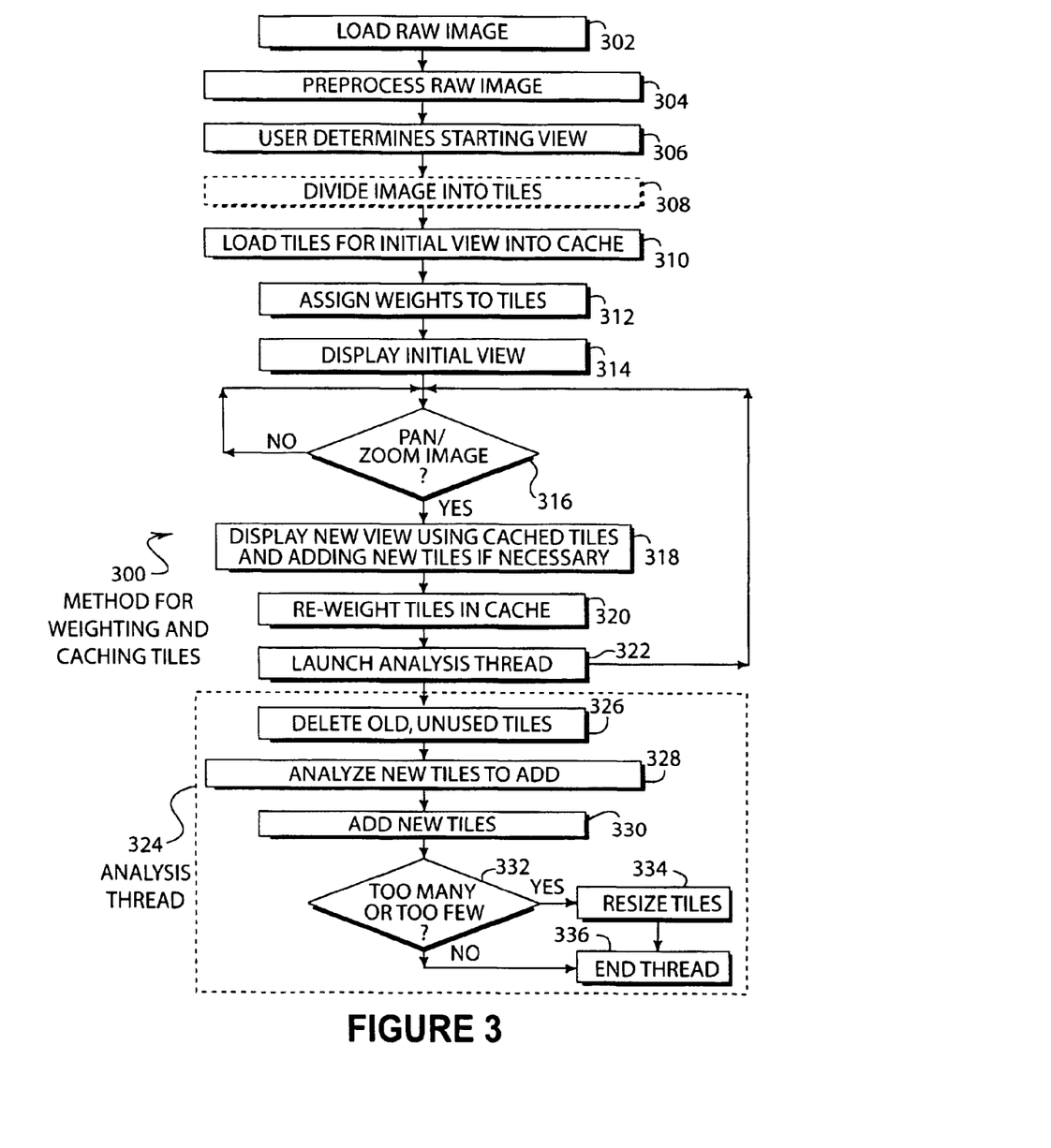
FIG. 3 is an illustration of a workflow diagram of an embodiment of the present invention of a method for weighting and caching tiles that are displayed.

FIG. 3 illustrates a workflow diagram of an embodiment of the present invention of a method 300 for weighting and caching tiles that are displayed. The method 300 incorporates the method 200 illustrated in FIG. 2.

The raw image is loaded 302, preprocessed 304, a starting view is determined 306, tiles are created from the raw image

308 if tiles were not created during the preprocessing step 304, and the tiles are loaded into the initial view 310. When the tiles are loaded into the initial view, the tiles are also loaded into a cache, whereupon the tiles are assigned weights 312 and the view is displayed 314.

The weights assigned to tiles are used by an algorithm for maintaining certain tiles in a cached memory for quick retrieval. Further, the weights of various tiles may be analyzed to predict which tiles may be used in the future and thus may be also loaded into the cache. The cache is an area of memory that is set aside by the present invention for holding tiles to be displayed. The cache may be a general area of memory or may be a dedicated memory specially adapted to cache tiles for very fast display.

When a zoom or pan command is issued 316, the display is updated to the required view 318. The tiles in cache are used and any tiles not in the cache are retrieved and brought into cache to be displayed. The tiles are assigned new weights 320, the analysis thread is launched 322, and the process awaits another pan or zoom command 316.

The analysis thread 324 is done during the period of time when the user is viewing the new view displayed on the screen. During this time, the computing device that is displaying the view may have some unused processing cycles whereby the cache may be updated.

The analysis thread 324 comprises deleting old, unused tiles 326, analyzing the cache to find new tiles to add 328, adding the new tiles 330, determining if the number of tiles is optimal 332, and resizing the tiles 334 if necessary. The analysis thread 324 manages the cache to optimize the tiles that are likely to be used. By keeping the correct tiles in the cache, the user may zoom and pan while enjoying very fast response from the display device.

The method for weighting the tiles, selecting those tiles to be deleted from cache, and determining which tiles to add to the cache may take on several forms. The characteristics of the weighting methods, including the criteria for selecting new tiles and discarding old tiles, may be dependent on the various applications. For example, the characteristics and behaviors of a user of a map displayed on a GPS receiver may be different from an architect or contractor viewing an image of building plans. Thus, the particular algorithms suited for each application may be different. Those skilled in the arts may use various weighting algorithms and criteria for adding and discarding tiles while still maintaining within the scope and intent of the present invention.

The size of the tiles may be adjusted 334 depending on several factors. For example, when the user zooms out, many more tiles are displayed on the screen at one time. The increased number of tiles means more computations are required to analyze the cache in addition to other factors. For some applications where the user may zoom in and out of the image repetitively, the tiles may be less likely to be resized at each zoom command. In such cases, the tiles may only be resized if the zoom ratio was relatively constant for a period of time.

Figure 4:
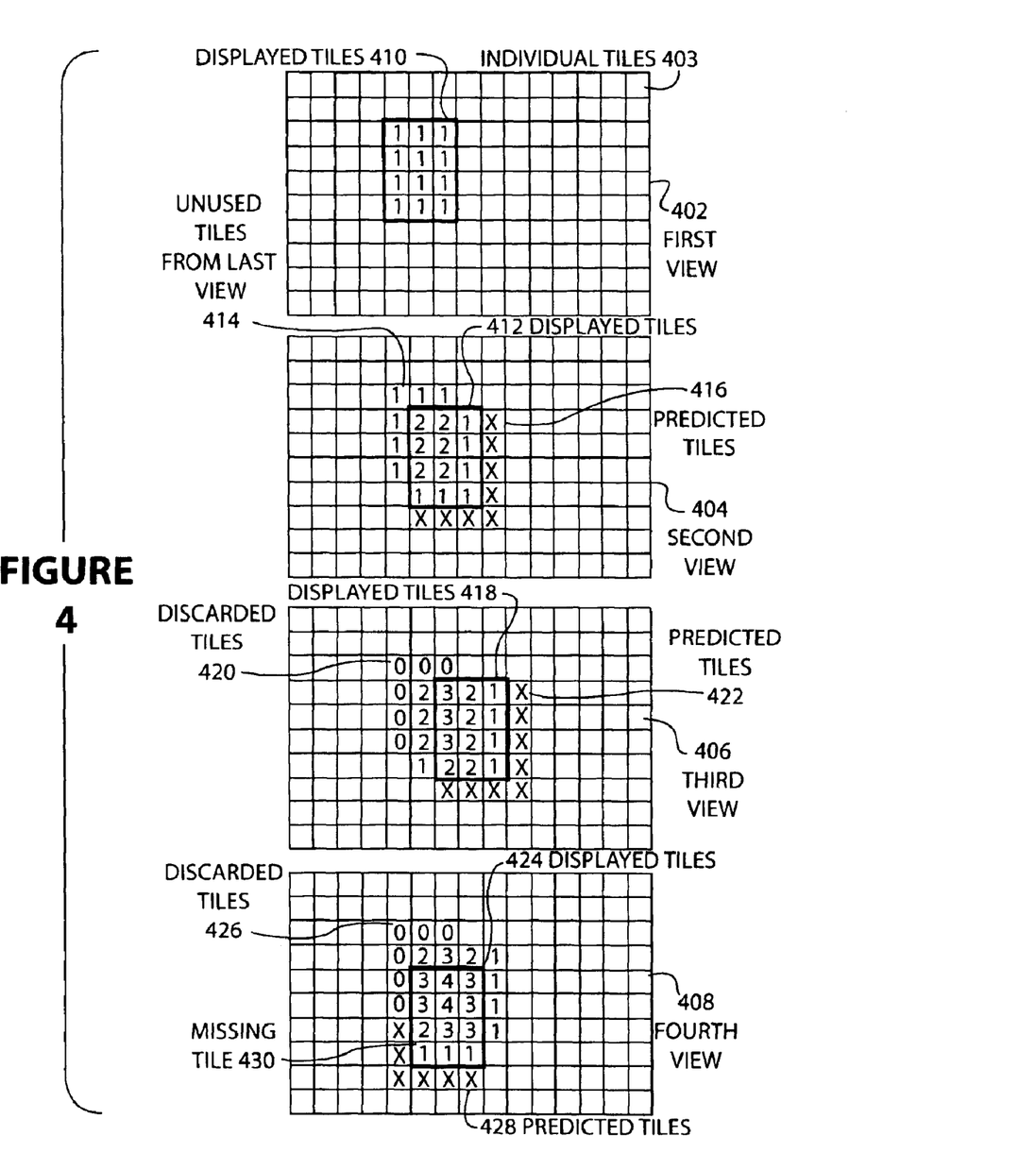
FIG. 4 is an illustration of a method for weighting tiles and an example of an embodiment of the decision criteria for adding new tiles and discarding old tiles from the cache.

FIG. 4 illustrates a method for weighting tiles and an example of an embodiment of the decision criteria for adding new tiles and discarding old tiles from the cache. Four sequential views 402, 404, 406, and 408 are shown. Each view is comprised of many individual cells 403, each of which represents a tile that may be placed in the cache.

In the present example, the weighting algorithm is as follows: each tile that is displayed has its weight incremented by one and those not displayed are decremented by one. Those tiles that were displayed in the previous view, but are not displayed in the current view, are not decremented but keep their weight unchanged. Those tiles with a weight of zero are removed from the cache.

In the first view 402, the displayed tiles 410 are all incremented to one by virtue of being displayed for the first time. At this point, only the tiles displayed are loaded into the cache. In other algorithms, additional criteria may be used to load additional tiles into cache. For the purposes of illustration, such criteria are not included in the present example.

In the second view 404, the user has panned the view downward one tile and rightward one tile. All of the tiles in the displayed tiles box 412 are incremented by one. The unused tiles from the previous view are left unchanged and are kept in the cache. Several predicted tiles 416 are loaded into the cache as well.

The prediction algorithm may analyze the movement of the view from the previous view. For example, the algorithm may determine the direction of movement and add those tiles necessary to display an additional movement continuing in the same direction.

The prediction algorithm may analyze the topology of the weights in the cache and determine tiles to add to the cache based on the slope or change of slope of successive tiles. For example, if successive tiles had weights of 2 and 1, the analysis may predict that the next tile in succession may be added to the cache. Such analyses may be performed horizontally, vertically, and diagonally across the cache.

In some cases, the predicted tiles 416 may be given a weight of one. In other cases, the predicted tiles 416 may be loaded and given another weight, such as 0.5, or no weight at all. The particular algorithm and rules used to predict which tiles to add may be changed based on the particular needs and behaviors of the user. Further, the capabilities of the display device may also be a factor when determining the particular algorithm and rules. For example, a device with very limited computational power may be capable of only rudimentary analysis whereas a high powered system may be capable of executing more detailed analysis algorithms.

The size of the cache may be a factor in the algorithm and rules for selecting which tiles to add to the cache. For example, a large cache may allow for an algorithm to add two, three, or more tiles past the limits of the displayed tiles 412 in the direction that the user has moved the view.

In the third view 406, the displayed tiles 418 are again incremented and several tiles are discarded 420. Additional tiles are predicted 422 and added to the cache. In the present view 406, all of the displayed tiles 418 were contained in the cache in the second view 404. In the third view 406, the cached tiles would be very quickly loaded and displayed.

In the fourth view 408, the user has moved the view downward one tile and leftward one tile. The displayed tiles 424 are incremented, several tiles are discarded 426, and several tiles are predicted 428 and thus added to the cache. When the user executed the move to the fourth view, all of the tiles were in memory except the missing tile 430. Tile 430 may have needed to be added to the cache to complete the display and may have caused a delay in completing the view requested by the user.

The algorithms and rules for discarding various tiles from the cache may include the effects of the limitations on memory size of the device. In the present example, all tiles that have a weight of zero are eliminated. In some embodiments, those tiles may be kept in the cache until the cache is close to being filled, at which time the tiles with the lowest weight would be removed to make room for new tiles.

Those skilled in the arts may develop various algorithms for selecting tiles to add and delete to and from a cache while maintaining within the scope and intent of the present invention. The example contained herein was selected to best illustrate a simple algorithm whereby a cache may be maintained. Various mathematical tools, including statistical analyses, adaptive algorithms, rules based on historical behaviors, and other algorithms may be developed as necessitated by the various applications of the present invention.

Figure 5:
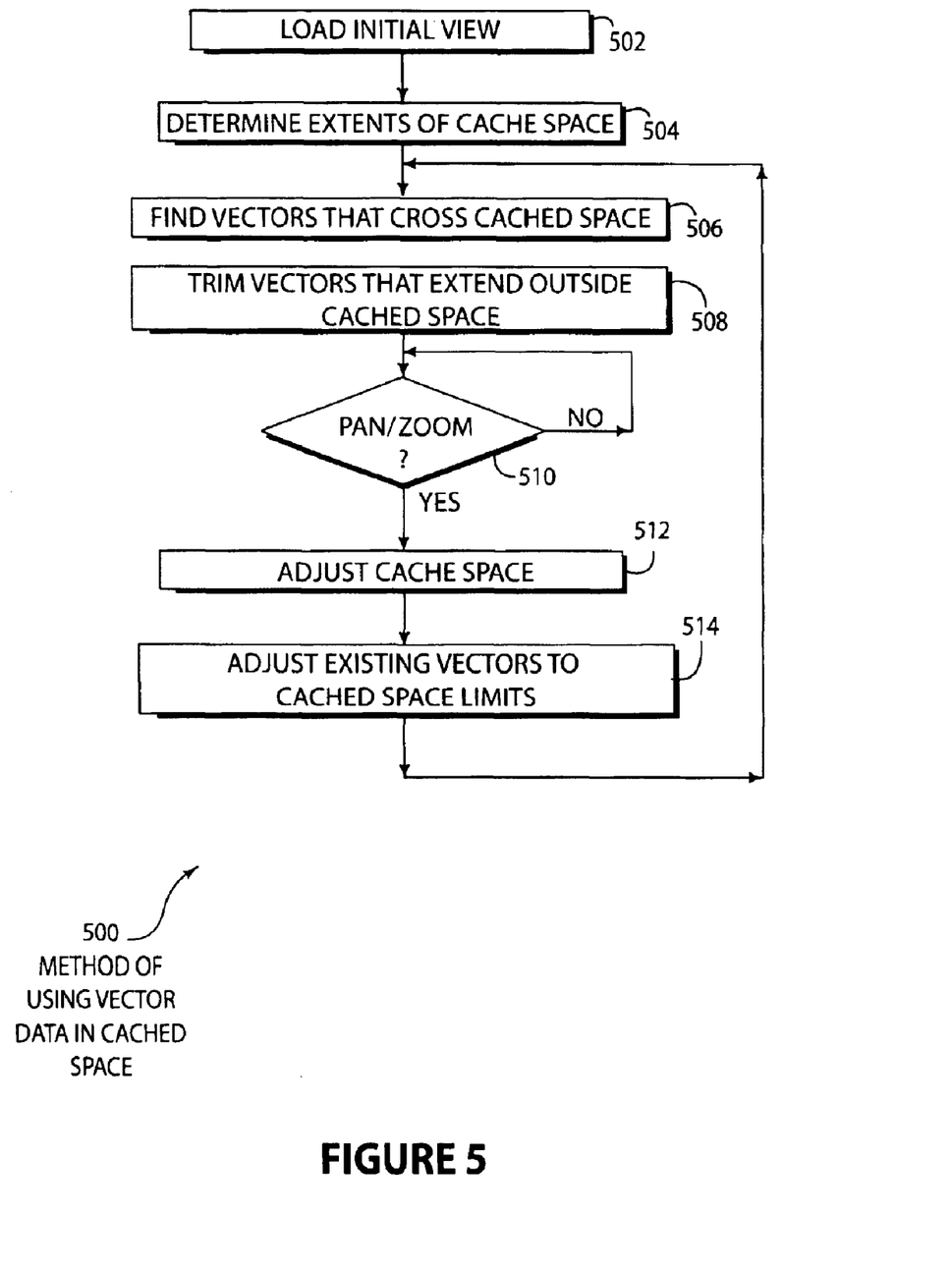
FIG. 5 is an illustration of a work flow diagram of a method of an embodiment of the present invention for handing vector data in a cached space.

FIG. 5 illustrates a work flow diagram of a method 500 of an embodiment of the present invention for handing vector data in a cache space. When the initial view is loaded 502, the extents of the cache space is determined 504, vectors that cross cache space are found 506 and trimmed 508. After a zoom or pan command is issued 510, cache space is adjusted 512 and any adjustments to vectors in cache space are made 514. The process continues by finding new vectors that cross cache space 506 and trimming those vectors 508.

The term cache space is used to denote that portion of the larger image that is in the cache at any time. Cache space is a subset of the raw image, but a superset of the displayed image.

The method 500 may be used for purely vector images or in conjunction with the method 300 to handle raster and vector data in the same image. For example, a map image may incorporate raster images with vector data for roads and political boundaries. Both types of data may be used in the present invention.

Determining the extents of cache space 504 and adjusting cache space 512 may be done using the various algorithms and rules as described for the method 300. In some cases, the rules for vector data may be adjusted for the peculiar nature of vector data. For example, a small shift in the cached space limits may not require that trimming or extending of a vector. In such a case, the computations required to further trim a vector may be avoided until a more significant shift in the cache space has occurred. As with method 300, various algorithms and rules may be developed for each application whereby the vector elements may be trimmed and extended based on a shift in cache space.

Figure 6:
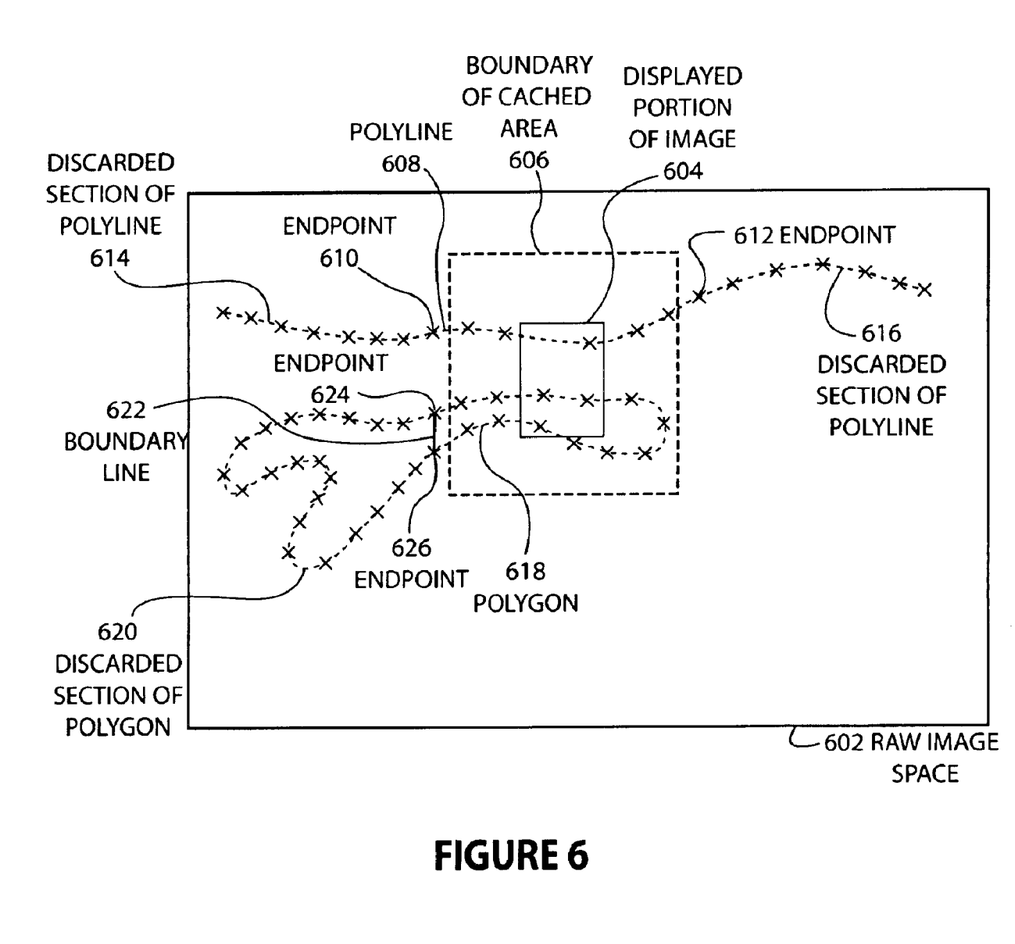
FIG. 6 is an illustration of the concept of trimming vector data that extends outside of cache space.

FIG. 6 illustrates the concept of trimming vector data that extends outside of cache space. The raw image space 602 contains the displayed portion of the image 604 and the cached area 606. A polyline 608 extends through the cached space 606 and the displayed portion 604. The endpoints 610 and 612 are the nearest endpoints on polyline 608 that are outside of the cache space 606. During a trimming process, the sections 614 and 616 are discarded from the polyline 608 and are not stored in cache memory.

Similarly, polygon 618 extends outside of the cache space 606. A temporary boundary line 622 is calculated between endpoints 624 and 626 and the section 620 of polygon 618 is discarded from memory.

As the cache space 606 moves due to shifts in the displayed image 604, the limits and extents of the polyline 608 and polygon 618 may also be adjusted using the method 500.

Hence, the present invention improves the image display performance by caching certain portions of an image in a high speed memory so that subsequent views of the image can be updated quickly. The cached portions of the image may be preprocessed and ready for directly writing to a device's display memory for maximum display speed. The present invention may allow limited capacity devices such as hand held computers and cellular phones to perform panning and zooming of large images with performance that rivals high performance computers. Further, the present invention may further enhance the performance of desktop computers.

The caching strategy has the ability to identify sections of an image that may be viewed in the future. These sections may be identified by algorithms and rules that may be tailored to specific applications and user behaviors. The ability to 'look ahead' and predict a user's needs means that the computational and time intensive operations of finding a portion of an image, reading the portion from a storage device, and preparing the portion to be displayed is done during periods when the device is waiting for user input and is otherwise idle.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of caching and rendering an image comprising:

providing a raw image to render;

preprocessing said raw image to produce a plurality of tiles;

determining a starting view, said starting view being a portion of said raw image and comprising a first set of tiles;

loading said first set of said tiles into memory;

displaying said starting view using said first set of tiles;

providing a weighting method that determines a weight for tiles;

applying said weight to each of said tiles based on said weighting method;

providing a first analysis method capable of analyzing said weight of each of said tiles to identify tiles that are not in said memory;

identifying at least one tile that is not in said memory using said analysis method; and loading said at least one tile into said memory.

2. The method of claim 1 wherein said weighting method comprises:

for each displayed tile, incrementing said weight; and for each non-displayed tile with a weight greater than zero, subtracting a value greater than or equal to zero from said weight.

3. The method of claim 1 further comprising:

providing a second analysis method capable of analyzing said weight of each of said tiles in said memory to identify tiles that have a weight below a predetermined level; and removing said tiles that have a weight below said predetermined level from memory.

4. The method of claim 1 further comprising:

determining a second view, said second view comprising a third set of tiles;

determining that a portion of said third set of tiles are in said memory and at least one of said tiles in said third set of tiles is not in memory;

displaying said portion of said third set of tiles that are in said memory;

loading said at least one of said tiles in said third set of tiles that is not in memory into memory as a new tile; and displaying said new tile.

5. The method of claim 1 wherein said raw image is a vector image.

6. The method of claim 1 wherein said raw image is a raster image.

7. A method of caching and rendering a raw image comprising:

receiving a raw image to render, said raw image comprising a plurality of vectors;

determining a starting view to display, said starting view being a portion of said raw image;

determining a cache space that is a superset of said starting view;

determining a first set of intersecting vectors that intersect said cache space;

trimming at least one of said vectors in said first set of vectors to approximately the limits of said cache space;

storing said intersecting vectors in a cache;

rendering said starting view by displaying said first set of intersecting vectors from said cache;

receiving a first command from a user to change the view to a second view;

determining if said second view is completely within said cache space;

if at least a portion of said second view is within said cache space, rendering said second view using at least a portion of said intersecting vectors stored in said cache; and if at least a portion of said second view is outside of said cache space, determining additional intersecting vectors that intersect said second view and rendering said second view using at least a portion of said additional intersecting vectors.

8. The method of claim 7 further comprising:

determining a new position for said cache space;

determining a second set of intersecting vectors that intersect said new position of said cache space;

trimming at least one of said vectors to approximately the limits of said cache space; and storing said second set of intersecting vectors in said cache.

9. The method of claim 8 wherein said determining a new position for said cache space comprises:

analyzing the distance between cache space and said second view; and if said distance is below a predetermined value, moving said cache space.

10. The method of claim 9 wherein said moving said cache space comprises centering said cache space with respect to said second view.

11. The method of claim 7 wherein said raw image further comprises a raster image.

12. A system for caching and rendering a raw image comprising:

a first computer system adapted to preprocess said raw image to produce a plurality of tiles;

a second computer system adapted to determine a starting view, said starting view being a portion of said raw image and comprising a first set of tiles, load said first set of said tiles into memory, display said starting view using said first set of tiles, apply a weight to each of said tiles based on a weighting method, identify at least one tile that is not in said memory using an analysis method, and load said at least one tile into said memory.

13. The system of claim 12 wherein said weighting method comprises:

for each displayed tile, incrementing said weight; and for each non-displayed tile with a weight greater than zero, subtracting a value greater than or equal to zero from said weight.

14. The system of claim 12 wherein said second computer system is further adapted to identify tiles that have a weight below a predetermined level, and remove said tiles that have a weight below said predetermined level from memory.

15. The system of claim 12 wherein said second computer system is further adapted to determine a second view, said second view comprising a third set of tiles, determine that a portion of said third set of tiles are in said memory and at least one of said tiles in said third set of tiles is not in memory, display said portion of said third set of tiles that are in said memory, load said at least one of said tiles in said third set of tiles that is not in memory into memory as a new tile, and display said new tile.

16. The system of claim 12 wherein said raw image is a vector image.

17. The system of claim 12 wherein said raw image is a raster image.

18. A system for caching and rendering a raw image comprising:

a first computer system adapted to receive a raw image to render, said raw image comprising a plurality of vectors, determine a starting view to display, said starting view being a portion of said raw image, determine a cache space that is a superset of said starting view, determine a first set of intersecting vectors that intersect said cache space, trim at least one of said vectors in said first set of vectors to approximately the limits of said cache space, and store said intersecting vectors in a cache;

a second computer system adapted to render said starting view by displaying said first set of intersecting vectors from said cache, receive a first command from a user to change the view to a second view, determine if said second view is completely within said cache space, if at least a portion of said second view is within said cache space, render said second view using at least a portion of said intersecting vectors stored in said cache, and if at least a portion of said second view is outside of said cache space, determine additional intersecting vectors that intersect said second view and rendering said second view using at least a portion of said additional intersecting vectors.

19. The system of claim 18 wherein said first computer system is further adapted to determine a new position for said cache space, determine a second set of intersecting vectors that intersect said new position of said cache space, trim at least one of said vectors to approximately the limits of said cache space, and store said second set of intersecting vectors in said cache.

20. The system of claim 19 wherein said second computer system is further adapted to analyze the distance between cache space and said second view, and if said distance is below a predetermined value, move said cache space.

21. The method of claim 18 wherein said raw image further comprises a raster image.

* * * * *